US006668108B1

(12) United States Patent
Helkey et al.

(10) Patent No.: US 6,668,108 B1
(45) Date of Patent: Dec. 23, 2003

(54) OPTICAL CROSS-CONNECT SWITCH WITH INTEGRATED OPTICAL SIGNAL TAP

(75) Inventors: Roger Helkey, Montecito, CA (US);
John Bowers, Santa Barbara, CA (US);
Tony Walter, Sunnyvale, CA (US);
Kevin Yamada, Sunnyvale, CA (US);
David Welsh, Yorba Linda, CA (US)

(73) Assignee: Calient Networks, Inc., San Jose, CA (US)

( * ) Notice: Subject to any disclaimer, the term of this patent is extended or adjusted under 35 U.S.C. 154(b) by 367 days.

(21) Appl. No.: 09/585,991

(22) Filed: Jun. 2, 2000

(51) Int. Cl.[7] .................................................. G02B 6/35
(52) U.S. Cl. ........................... 385/18; 385/17; 385/42; 385/48
(58) Field of Search .......................... 385/17–18, 42, 385/48

(56) References Cited

U.S. PATENT DOCUMENTS

| 4,243,297 A | 1/1981 | Elion |
| 4,365,863 A | 12/1982 | Broussaud |
| 4,421,381 A | 12/1983 | Ueda et al. |
| 4,598,585 A | 7/1986 | Boxenhorn |
| 4,611,886 A | 9/1986 | Cline et al. |
| 4,654,663 A | 3/1987 | Alsenz et al. |
| 4,848,999 A | 7/1989 | Taylor |
| 4,892,388 A | 1/1990 | Taylor |
| 4,900,119 A | 2/1990 | Hill et al. |
| 4,922,756 A | 5/1990 | Henrion |
| 4,923,273 A | 5/1990 | Taylor |
| 4,941,724 A | 7/1990 | Couden et al. |
| 5,016,072 A | 5/1991 | Greiff |
| 5,083,857 A | 1/1992 | Hornbeck |
| 5,097,354 A | 3/1992 | Goto |
| 5,172,262 A | 12/1992 | Hornbeck |
| 5,203,208 A | 4/1993 | Bernstein |
| 5,204,922 A | 4/1993 | Weir et al. |
| 5,226,321 A | 7/1993 | Varnham et al. |

(List continued on next page.)

FOREIGN PATENT DOCUMENTS

| EP | 1 120677 A2 | 8/2001 |
| GB | 2 175 705 A | 12/1986 |
| JP | 60-107017 | 6/1985 |
| JP | 5-107485 A | 4/1993 |
| JP | 6-180428 | 6/1994 |

OTHER PUBLICATIONS

Robert E. Mihailovich, Z. L. Zhang, K. A. Shaw, and Noel C. MacDonald, "Single–Crystal Silicon Torsional Resonators." School of Electrical Engineering, Cornell University, Ithaca, NY 14853, pp. 184–188, IEEE (Feb. 1993).

Lin L. Y. et al., "Micro–electro–mechanical systems (MEMS) for WDM optical–crossconnect networks" Military Communications Conference Proceedings, 1999. Milcom 1999. IEEE Atlantic City, NJ, USA Oct. 31—Nov. 3, 1999, Pisxataway, NJ, USA, IEEEE, US, Oct. 31, 1999, pp. 954–957, XP01036982, ISBN: 0–7803–5538–5.

PCT Search Report, International Application No. PCT/US 01/40800, May 24, 2001, 4 pages.

*Primary Examiner*—Akm Enayet Ullah
*Assistant Examiner*—Jerry T Rahll
(74) *Attorney, Agent, or Firm*—Blakely, Sokoloff, Taylor & Zafman LLP

(57) ABSTRACT

An optical cross-connect with integrated optical signal tap is disclosed. In one embodiment, the switch includes two or more optical fiber input ports, lenses to produce collimated beams, one or more optical taps to couple a portion of the optical power from one or more input ports to one or more sample ports, movable mirrors to connect any input port with any output port, two or more optical fiber output ports, and lens to couple collimated beams into the output ports.

33 Claims, 14 Drawing Sheets

U.S. PATENT DOCUMENTS

| | | | |
|---|---|---|---|
| 5,450,512 A | * 9/1995 | Asakura | 385/48 |
| 5,488,862 A | 2/1996 | Neukermans et al. | |
| 5,524,153 A | 6/1996 | Laor | |
| 5,536,988 A | 7/1996 | Zhang et al. | |
| 5,555,330 A | 9/1996 | Pan et al. | |
| 5,568,575 A | 10/1996 | Sato | |
| 5,629,790 A | 5/1997 | Neukermans et al. | |
| 5,642,447 A | 6/1997 | Pan et al. | |
| 5,642,448 A | 6/1997 | Pan et al. | |
| 5,652,814 A | 7/1997 | Pan et al. | |
| 5,673,139 A | 9/1997 | Johnson | |
| 5,889,904 A | 3/1999 | Pan et al. | |
| 5,900,983 A | 5/1999 | Ford et al. | |
| 5,920,417 A | 7/1999 | Johnson | |
| 5,960,133 A | 9/1999 | Tomlinson | |
| 5,982,554 A | 11/1999 | Goldstein et al. | |
| 6,000,280 A | 12/1999 | Miller et al. | |
| 6,023,542 A | 2/2000 | Pan et al. | |
| 6,049,412 A | 4/2000 | Bergmann et al. | |
| 6,055,998 A | 5/2000 | Bader | |
| 6,097,858 A | 8/2000 | Laor | |
| 6,097,859 A | * 8/2000 | Solgaard et al. | 385/17 |
| 6,097,860 A | 8/2000 | Laor | |
| 6,101,299 A | 8/2000 | Laor | |
| 6,198,858 B1 | 3/2001 | Pan et al. | |
| 6,201,622 B1 | 3/2001 | Lobbett et al. | |
| 6,208,784 B1 | 3/2001 | Glen et al. | |
| 6,226,425 B1 | 5/2001 | Chang-Hasnain et al. | |
| 6,236,481 B1 | 5/2001 | Laor | |
| 6,240,222 B1 | 5/2001 | Bergmann | |
| 6,249,626 B1 | 6/2001 | Bergmann | |
| 6,253,001 B1 | 6/2001 | Hoen | |
| 6,278,812 B1 | 8/2001 | Lin et al. | |
| 6,289,145 B1 | 9/2001 | Solgaard et al. | |
| 6,314,115 B1 | 11/2001 | Delfyett et al. | |

* cited by examiner

OPTICAL CROSS-CONNECT SWITCH WITH INTEGRATED OPTICAL SIGNAL TAP

FIELD OF INVENTION

The present invention pertains to the field of micro-electro-mechanical-system (MEMS) devices. More particularly, the present invention relates to a MEMS mirror device.

BACKGROUND OF THE INVENTION

A MEMS device is a micro-sized mechanical structure having mechanical devices fabricated, for example, by using conventional integrated circuit (IC) fabrication methods. One type of MEMS device is a microscopic gimbaled mirror device. A gimbaled mirror device includes a mirror component, which is suspended off a substrate, and is able to pivot about two axes. Motion is caused by electrostatic actuation. Electrostatic actuation creates an electric field that causes the mirror component to pivot. By allowing the mirror component to pivot in two axes, the mirror component is capable of having an angular range of motion in which the mirror component can redirect light beams to varying positions across a two-dimensional surface.

FIG. 1 shows an example of a MEMS gimbaled mirror device used to redirect light beams in an optical switch. Light beams from fibers 1 located in input fiber array 2 are input to the optical switch and travel through input lens array 3. Each beam is then reflected from a mirror located on input movable mirror array 4 to another mirror on output mirror array 5. The light beams then travel through lens array 6 to output fiber array 7. Thus, a given beam is switched from an input fiber of input fiber array 2 to an appropriate output fiber of output fiber array 7 by being redirected by mirror arrays 4 and 5.

For this type of optical networking application, the intensity of the signals at the input or the output of the switch may be monitored to verify that the network is operating properly. Thus, a fiber tap array 9 is optically coupled to the fibers of input fiber array 2. The light beams traveling through each fiber of fiber array 2 are then sampled by diverting a portion of the beams through fiber tap array 9 to receivers in electrical receiver array 91. The receivers in receiver array 91 may convert the optical signals into digital electronic signals, or an optical switch may be used to multiplex the signals into a single electrical receiver. A disadvantage of this approach is that an individual tap fiber in tap array 9 must be connected to each input fiber of input array 2. Another disadvantage is that an individual receiver must be connected to each tap fiber. Therefore, the cost of monitoring the signals using this approach can be very high.

SUMMARY OF THE INVENTION

An optical cross-connect with integrated optical signal tap is disclosed. In one embodiment, the switch includes two or more optical fiber input ports, lenses to produce collimated beams, one or more optical taps to couple a portion of the optical power from one or more input ports to one or more sample ports, movable mirrors to connect any input port with any output port, two or more optical fiber output ports, and lens to couple collimated beams into the output ports.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An optical cross-connect with integrated optical signal tap is disclosed. In one embodiment, the switch includes two or more optical fiber input ports, lenses to produce collimated beams, one or more optical taps to couple a portion of the optical power from one or more input ports to one or more sample ports, movable mirrors to connect any input port with any output port, two or more optical fiber output ports, and lens to couple collimated beams into the output ports.

An advantage of the optical cross-connect with integrated optical signal tap is providing a free space optical signal tap, thus eliminating the tap fibers of the signal taps external to the optical switch. Another advantage of the optical cross-connect with integrated optical signal tap is providing an optical sampling device that can use the substrates of other components of the optical switch. A further advantage is providing a sampling device that has a fewer number of sampling fibers than the number of input and output fibers. Thus, the optical sampling device of the present invention can be included in an optical switch without all of the expensive hardware components required by the external signal taps.

Figure 1:
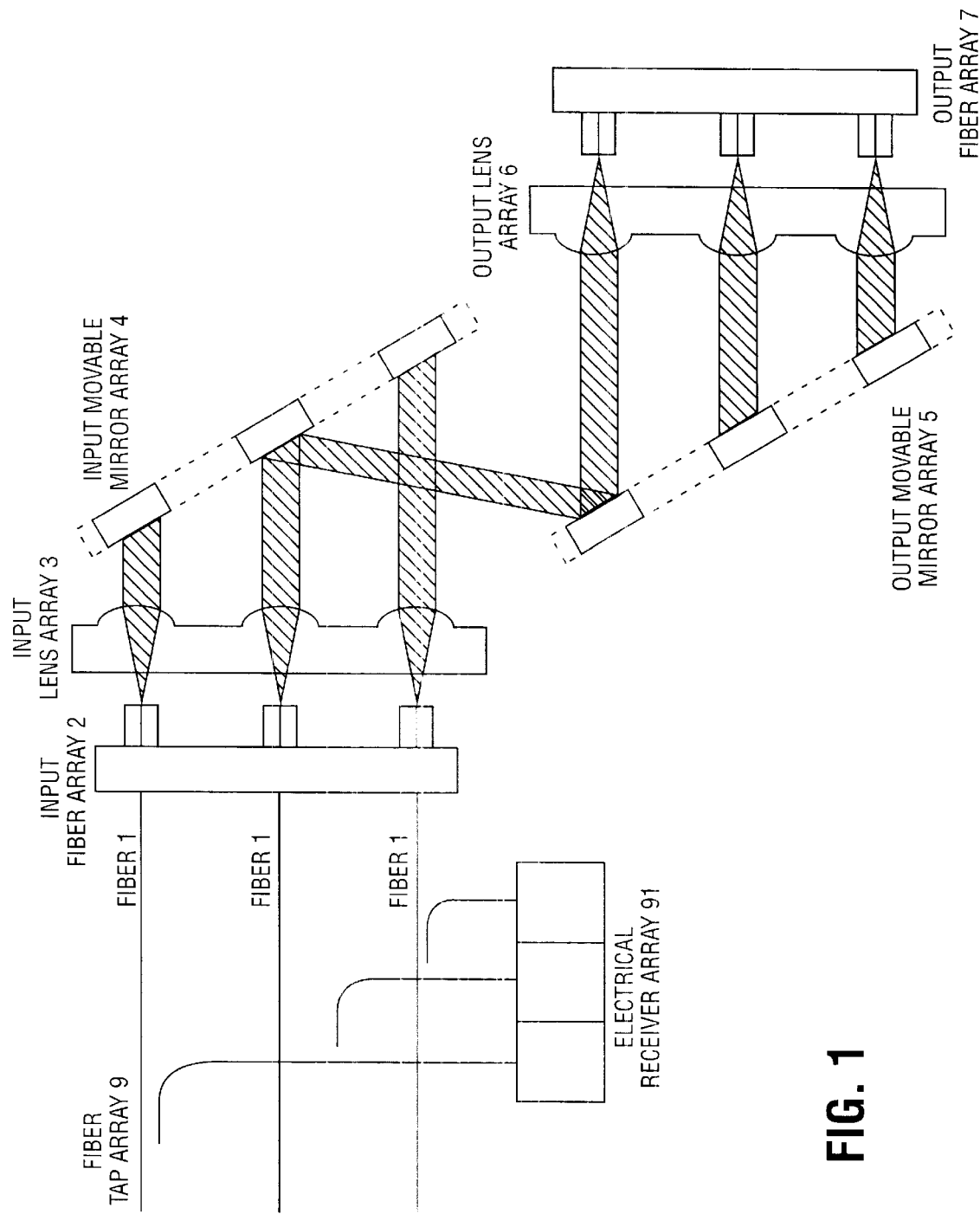
FIG. 1 is one embodiment of a sampling apparatus.
Figure 2:
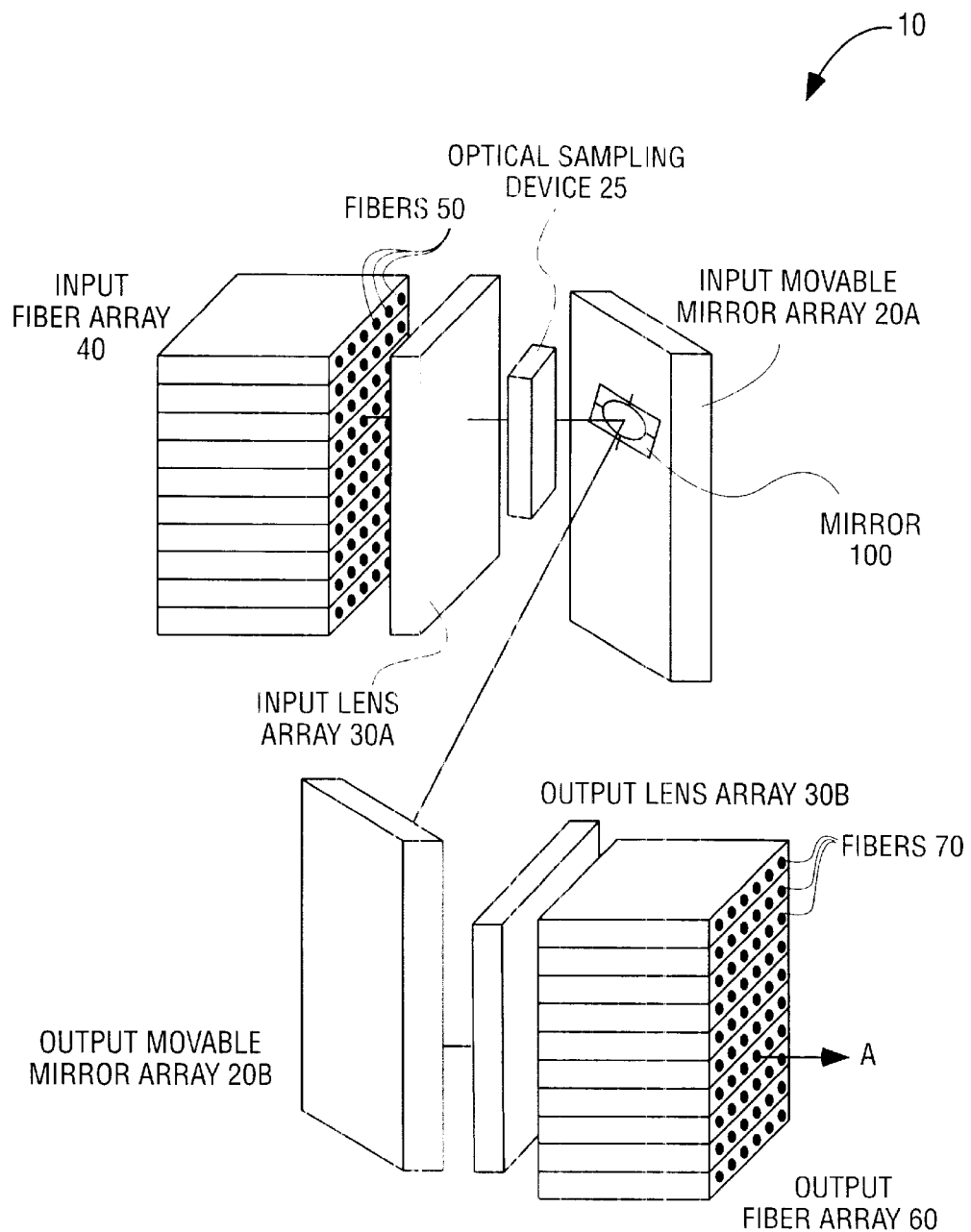
FIG. 2 is a cross-section of an embodiment of an optical switch and sampling device.

FIG. 2 is an illustration of an exemplary optical switching system 10 for practicing the invention. For example, optical switching system 10 may represent a 3-dimensional optical switching system. A 3-dimensional optical switching system allows for optical coupling between input fibers and output fibers in different planes using lens arrays and mirror arrays. The lens arrays and mirror arrays provide proper angle and position of light beams traveling from input fibers to output fibers. That is, a light beam must leave and enter a fiber in a direct path. Thus, using the optical switch shown in FIG. 2, any optical input can be connected to any optical output through the mirror arrays 20A and 20B, which contain mirrors that can be rotated along two axes.

Referring to FIG. 2, optical switching system 10 includes input fiber array 40, input lens array 30A, optical sampling device 25, input MEMS movable mirror array 20A, output MEMS movable mirror array 20B, output lens array 30B, and output fiber array 60.

Input fiber array 40 provides a plurality of optical fibers 50 for transmitting light to input lens array 30A. Input lens array 30A includes a plurality of optical lenses, which are used to collimate and focus beams of light from input fiber array 40 to individual MEMS mirror devices on MEMS input movable mirror array 20A. MEMS input movable mirror array 20A includes a plurality of electrically addressable MEMS mirror devices 100.

MEMS mirror device 100 may be a gimbaled mirror device having a rectangular shape. Alternatively, MEMS mirror device 100 may be a gimbaled mirror device having an elliptical or circular shape. The plurality of MEMS mirror devices 100 for MEMS input movable mirror array 20A can pivot a mirror component to redirect or reflect light to varying MEMS mirror devices on second MEMS mirror array 20B. MEMS output movable mirror array 20B also includes a plurality of MEMS mirror devices such as MEMS mirror device 100, which are used to redirect and reflect light beams to varying lenses on output lens array 30B. Output lens array 30B collimates and focuses beams of light from output mirror array 20B to individual output fibers 70 of output fiber array 60.

Optical switching system 10 allows light beams from any input fiber 50 of input fiber array 40 to be redirected to any output fiber 70 of output fiber array 60. For example, a light beam following the path "A" is emitted from one input fiber and is redirected using MEMS movable mirror arrays 20A and 20B to a different output fiber. The MEMS movable mirror arrays may also be used in scanning systems, printing systems, display systems, and other systems that require redirecting beams of light.

As the light beams travel from first lens array 30A to first MEMS mirror array 20A, the light beams pass through optical sampling device 25. The light beams are separated into a first portion and a second portion. The first portion of the light beams continue to travel through the optical sampling device 25 to output fiber array 60 as discussed above. The sampling portion light beams are used by device 25 to monitor and evaluate the performance of the optical network. In an alternative embodiment, optical sampling device 25 may be located in between second MEMS mirror array 20B and second lens array 30B.

Figure 3:
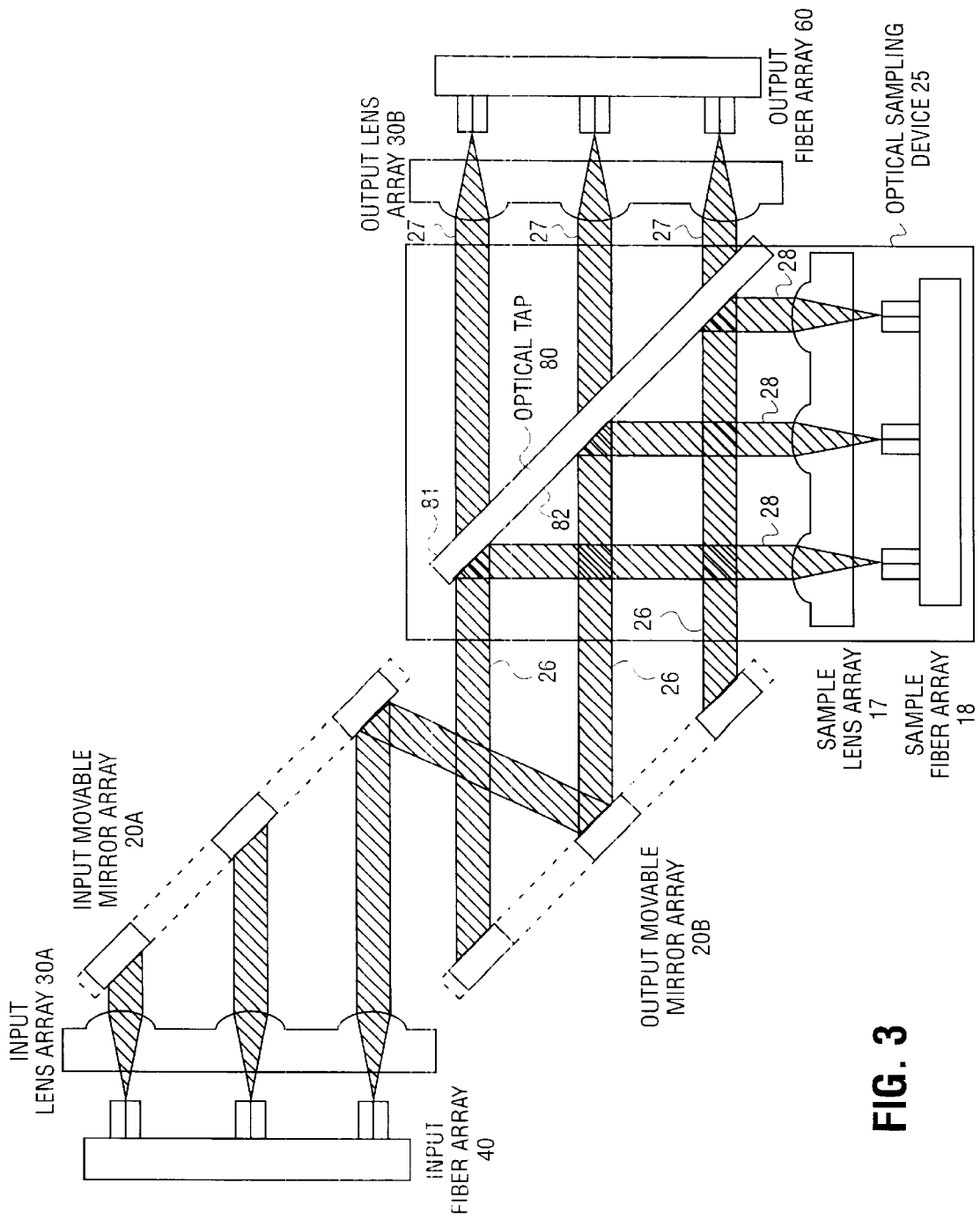
FIG. 3 is a cross-section of an embodiment of an optical switch and sampling device with an internal tap sampling optical signals at the switch output into a fixed array of fibers.

In one embodiment, the optical signals are sampled as shown in FIG. 3. Light beams 26 traveling from output movable mirror array 20B pass through an optical tap 80, which may be a free-space optical beam splitter. The optical tap 80 splits each light beam, or optical signal, into two portions, a stronger majority portion 27 and a weaker sample portion 28. The stronger portion 27 of the signal is directed to the output lens array 30B and output fiber array 60 of the optical switch. The weaker portion 28 of the signal directed to optical sampling device 25, which includes sample lens array 17 and sample fiber array 18. In one embodiment, the sampled signal 28 is less-than 10 percent of the power of the switch output signal 27 in order to reduce the switch loss induced by sampling and to reduce the induced polarization dependant loss.

The free-space beam splitter used for the optical tap 80 may be formed by a glass plate with an antireflection coating on one surface 81. The other surface 82 may have an optical coating that determines the optical splitting ratio to the sampled port. Alternatively, surface 82 may be an uncoated dielectric-air interface. The optical tap glass plate 80 may be a triangular piece of glass. Optical tap glass plate 80 may consist of two pieces of glass created together with a reflective coating at the interface. Alternatively, the optical tap 80 may be a pellicle beam splitter consisting of a thin dielectric membrane.

Figure 4:
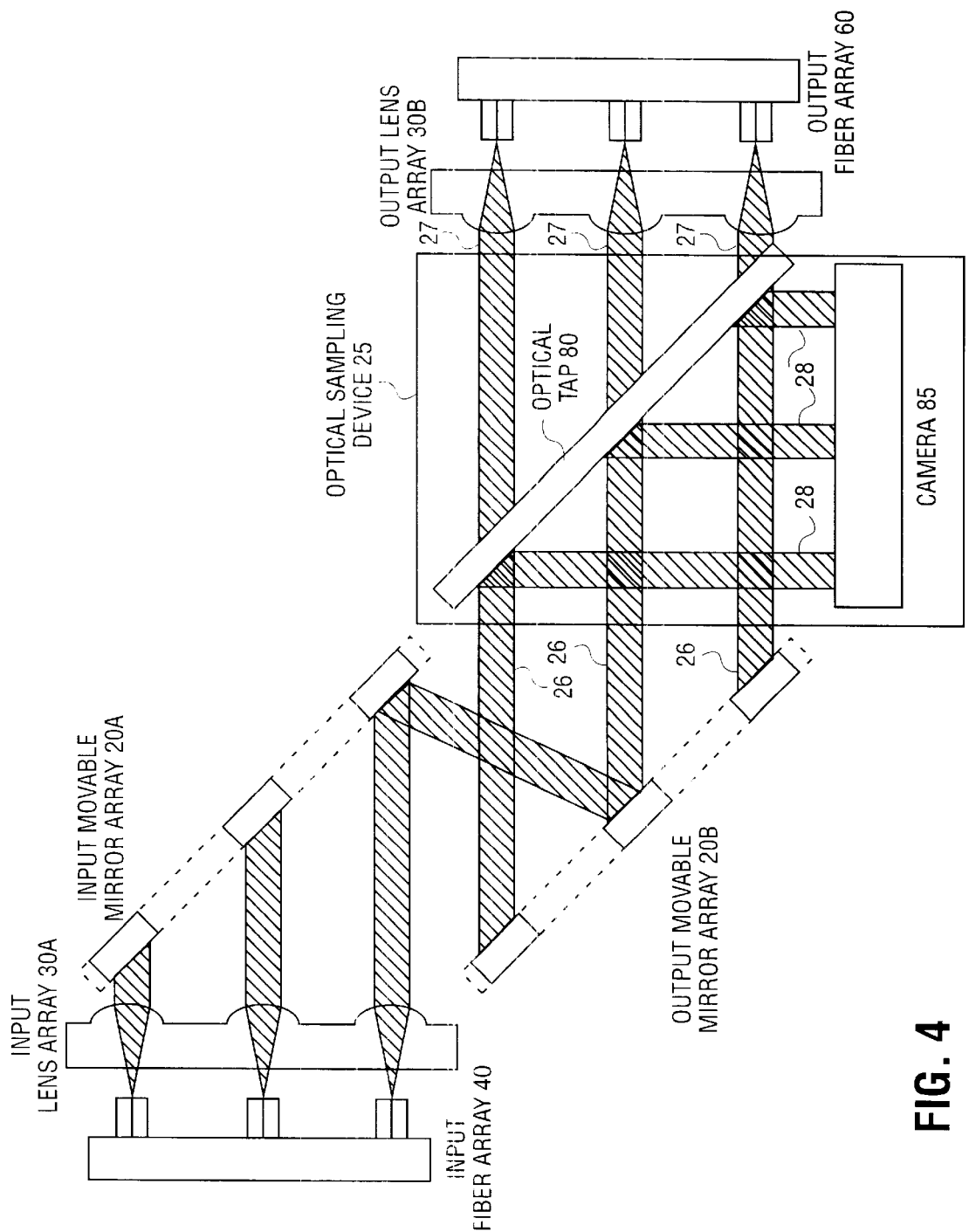
FIG. 4 is a cross-section of an embodiment of an optical switch and sampling device with an internal tap for camera used to monitor or set mirror angles for optical beam alignment.

The optical alignment of the light beams may also be monitored or set by sending sample signals from optical tap 80 to a camera 85 as shown in FIG. 4. The camera can be used to observe the position of each optical beam relative to the lens array. The camera 85 may include a charge-coupled device (CCD).

The camera can be sensitive to the optical wavelength of the light 26 traveling through the switch, for example, 1.3 $\mu$m or 1.55 $\mu$m. In one implementation, test optical signals are reflected from the mirrors, where the wavelength of the test signals is chosen for increased sensitivity from the camera (for example, less than 1 $\mu$m). In one implementation, two sets of test optical signals and two cameras are used to determine the mirror angles of each array separately, and the test signals are incident from a different angle than the optical path.

Figure 5:
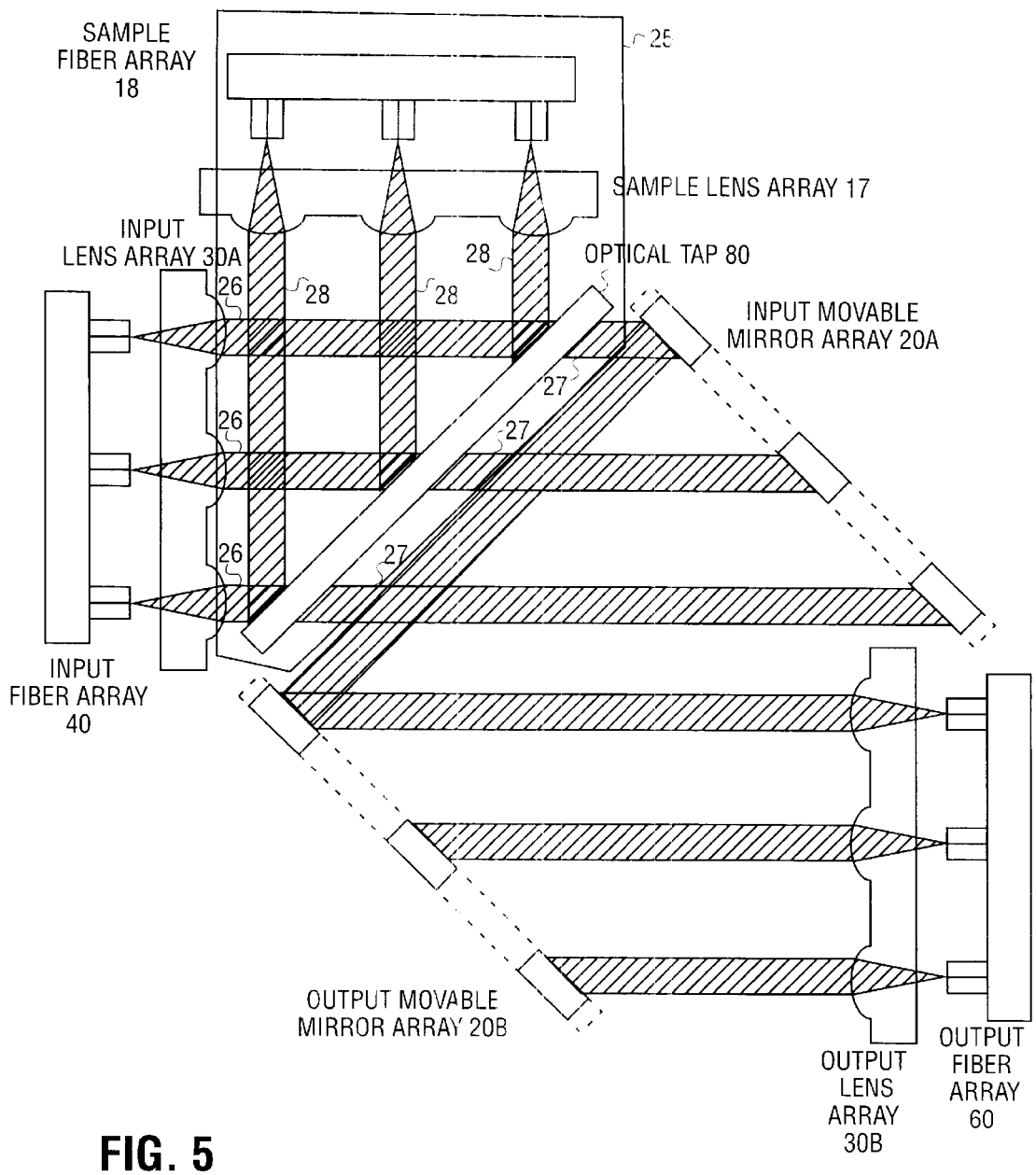
FIG. 5 is a cross-section of an optical switch and sampling device with an internal tap coupling the switch inputs to a fixed array of fibers.

An alternative embodiment for optical sampling is shown in FIG. 5, which has optical sampling device 25 located in between input lens array 30A and input movable mirror array 20A, thus providing several advantages. One advantage is keeping the optical path length the same as the optical path length in the switch without the tap. Another advantage is increasing the power of the sample light beams.

Sampling device 25 includes opticlal tap 80, and is located in between input lens array 30A and input movable mirror array 20B. Optical tap 80 separates the light beams 26 into a sample portion 28 of light beams and a majority portion 27 of light beams. The sample portion of the input light beams are deflected by optical tap 80 through sample lens array 17 to sample fiber array 18. The majority portion of the light beams travel through the remainder of the switch to output fiber array 60, as discussed above.

Because the optical tap 80 is located at the input portion of the optical switch, the sampled optical power is increased. However, the substrate angle of mirror arrays 20A and 20B has been reduced. In one embodiment, the substrate angle of mirror arrays 20A and 20B is reduced from 45 degrees to 22.5 degrees. Alternatively, the angle of the output movable mirror array 20B substrate is larger than the rotational angle of the mirrors located on the input movable mirror array 20A. This embodiment of an optical tap provides the advantage of a free-space optical tap without an increase in optical path length.

Figure 6:
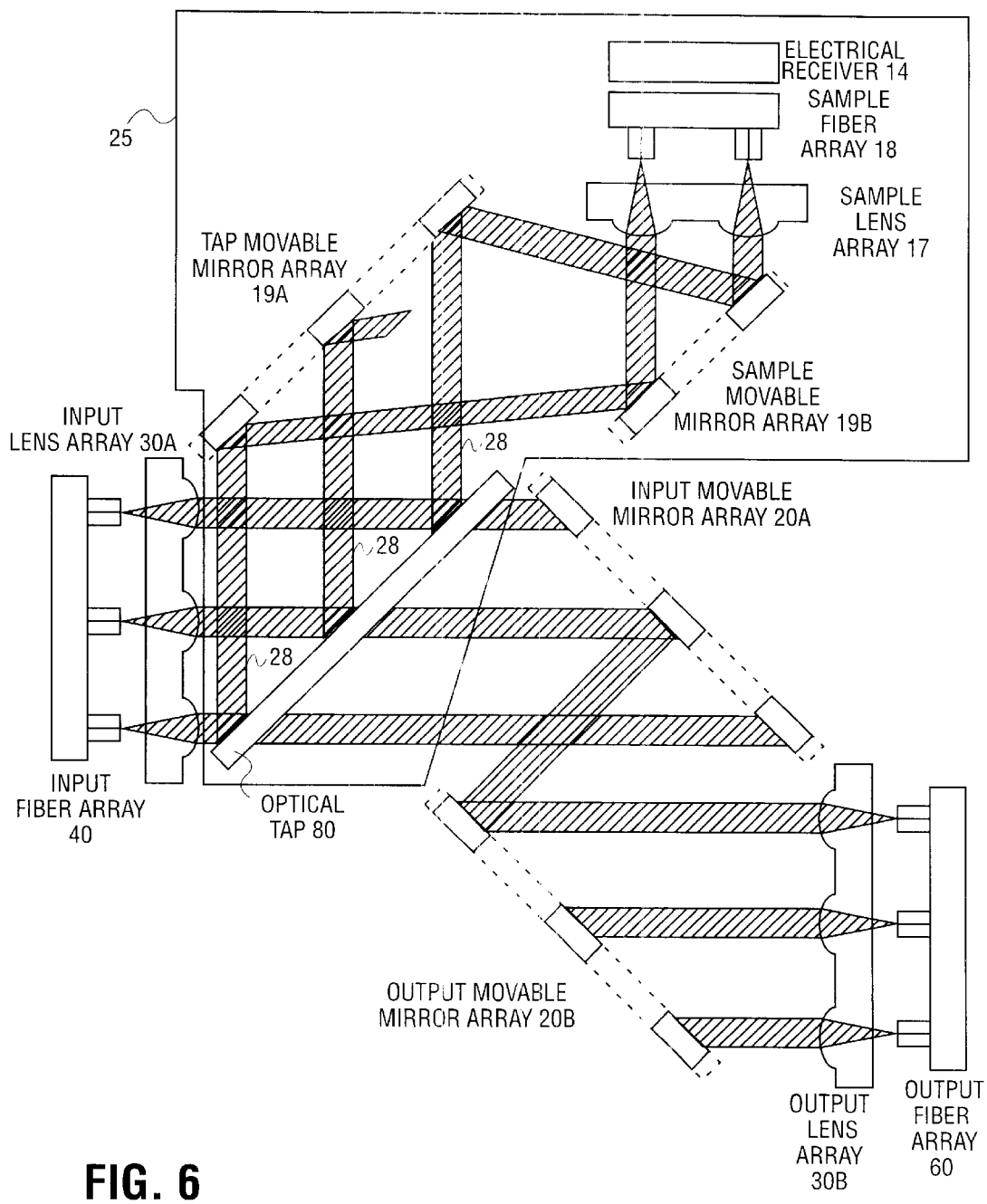
FIG. 6 is a cross-section of an embodiment of an optical switch and sampling device with an optical tap and pairs of movable mirrors used to sample the output signals into one or more optical fibers.

An alternative embodiment of an optical sampling device 25 is shown in FIG. 6. The alignment tolerances for the optical components in FIG. 3 and FIG. 5, such as a light beam entering an optical fiber in the sampling array, are very tight. In FIG. 5, each optical sample signal 28 must be incident on a sample lens of sample lens array 17 at a correct angle and position for the light beam to enter into a single-mode fiber of sample fiber array 18. If the light beam 28 is not at a correct angle, the beam will not enter the fiber.

An alternative embodiment of an optical sampling dense is shown in FIG. 6. The embodiment as shown in FIG. 6 allows a larger alignment tolerance by using a second set of movable mirrors 19A and 19B for aligning the sample light beams. The sample portion of the light beams is reflected from tap movable mirror array 19A and sample movable mirror array 19B to sample lens array 17 and sample fiber array 18. Redirecting and aligning the sample light beams using mirror arrays 19A and 19B enables each sample light beam 28 to strike an optical fiber of sample fiber array 18 at an angle that enables the sample light beam to enter the fiber.

In one embodiment of FIG. 6, each sample optical fiber of sample fiber array 18 can periodically sample a number of input ports from input fiber array 40. Thus, the number of sample ports, or sample fibers, can be less than the number of input fibers, or ports, of input array 40. In this embodiment, the number of mirrors in tap movable mirror array 19A may be the same as the number of fibers in input fiber array 40, in order to sample any input port. However, the number of mirrors in sample movable mirror array 19B may be the same as the number of fibers in sample fiber array 18.

Figure 7:
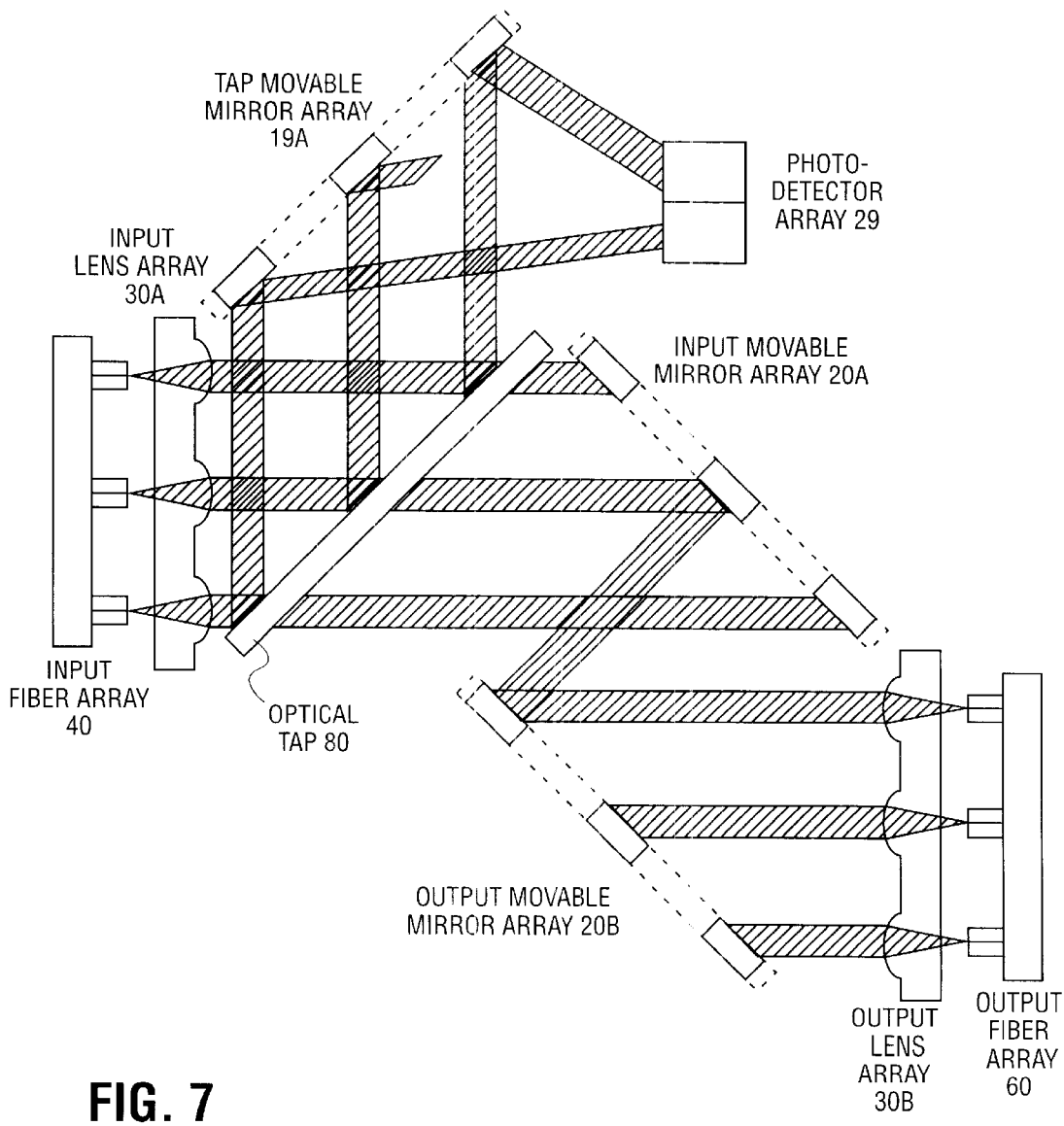
FIG. 7 is a cross-section of an embodiment of an optical switch and sampling device with an array of movable mirrors to sample several optical signals simultaneously.

The embodiment as shown in FIG. 6 can be simplified by using a photodetector array 29 to convert the optical signals to electrical signals, as shown in FIG. 7. In the embodiment of FIG. 7, the sample movable mirror array 19B, and sample fiber array 18 of FIG. 6 are not needed. The photodetectors 29 can operate with a wide range of optical beam angles, so only one tap movable mirror array 19A is used to direct the desired sample light beams from optical tap 80 to photodetectors 29. A lens array may not be needed between tap movable mirror array 19A and photodetector array 29 if the size of the photodetector active region is larger than the size of the optical beams. The photodetectors may have high bandwidth to allow operation to 10 GB/sec, for example.

Figure 8:
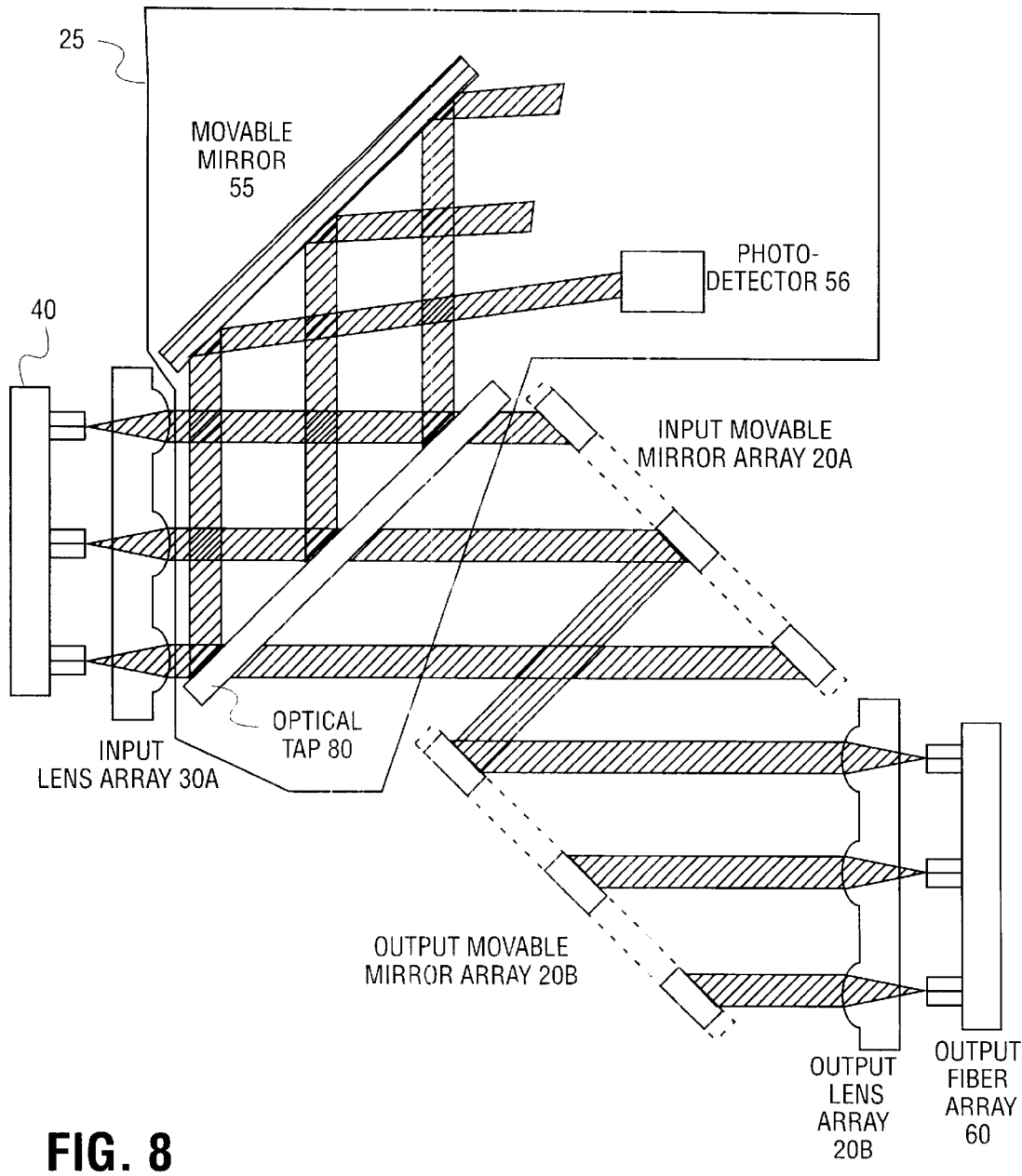
FIG. 8 is a cross-section of an embodiment of an optical switch and sampling device with a movable mirror to sample one of the input signals.

FIG. 8 is an alternative embodiment of FIG. 7 that reduces the hardware complexity of FIG. 7. Light beams travel from input fiber array 40 to optical tap 80, where the light beams 26 are separated into a sample portion 28 and a majority portion 27 as discussed above in relation to FIG. 5. In this embodiment, only one sampled signal 28 is needed at a time. Therefore, a single large movable mirror 55 can be used to direct a sample light beam from any input fiber of input fiber array 40 to a single photodetector 56.

Figure 9:
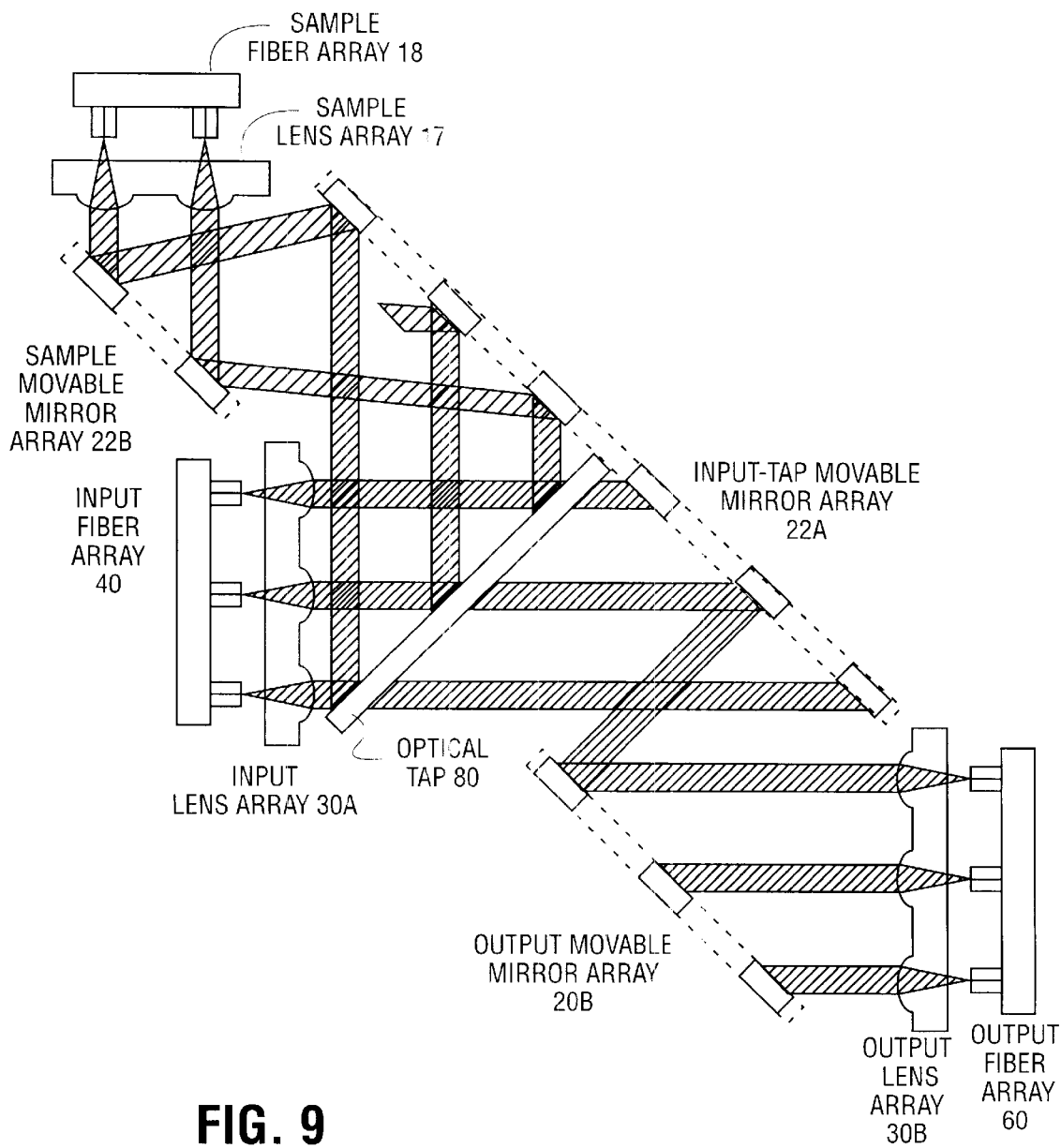
FIG. 9 is an embodiment of an optical switch and sampling device having sampled mirrors on the same substrate as the input mirror array.

In another embodiment, as shown in FIG. 9, the hardware complexity of the optical switch with the optical sampling device is reduced by using fewer mirror arrays. In this embodiment, the tap movable mirror array is integrated on the same substrate as the input movable mirror array to provide a single combined input and tap movable mirror array 22A, with the same number of total mirrors as would be required if the input mirror array and two mirror array were separated.

Light beams from the input fiber array 40 are approximately collimated by input lens array 30A. The light beams are then separated into a sample portion and a majority portion by optical tap 80. The sample portion light beams are directed by the combined input and tap movable mirror array 22A to sample movable mirror array 22B. Then the beams are directed through sample lens array 17 into sample fiber array 18. The majority portion light beams are directed to output fiber array 60 as discussed above.

In alternative embodiments, the tap movable mirror array or sample movable mirror array can be combined on the same substrate as the input movable mirror array or output movable mirror array.

Figure 10:
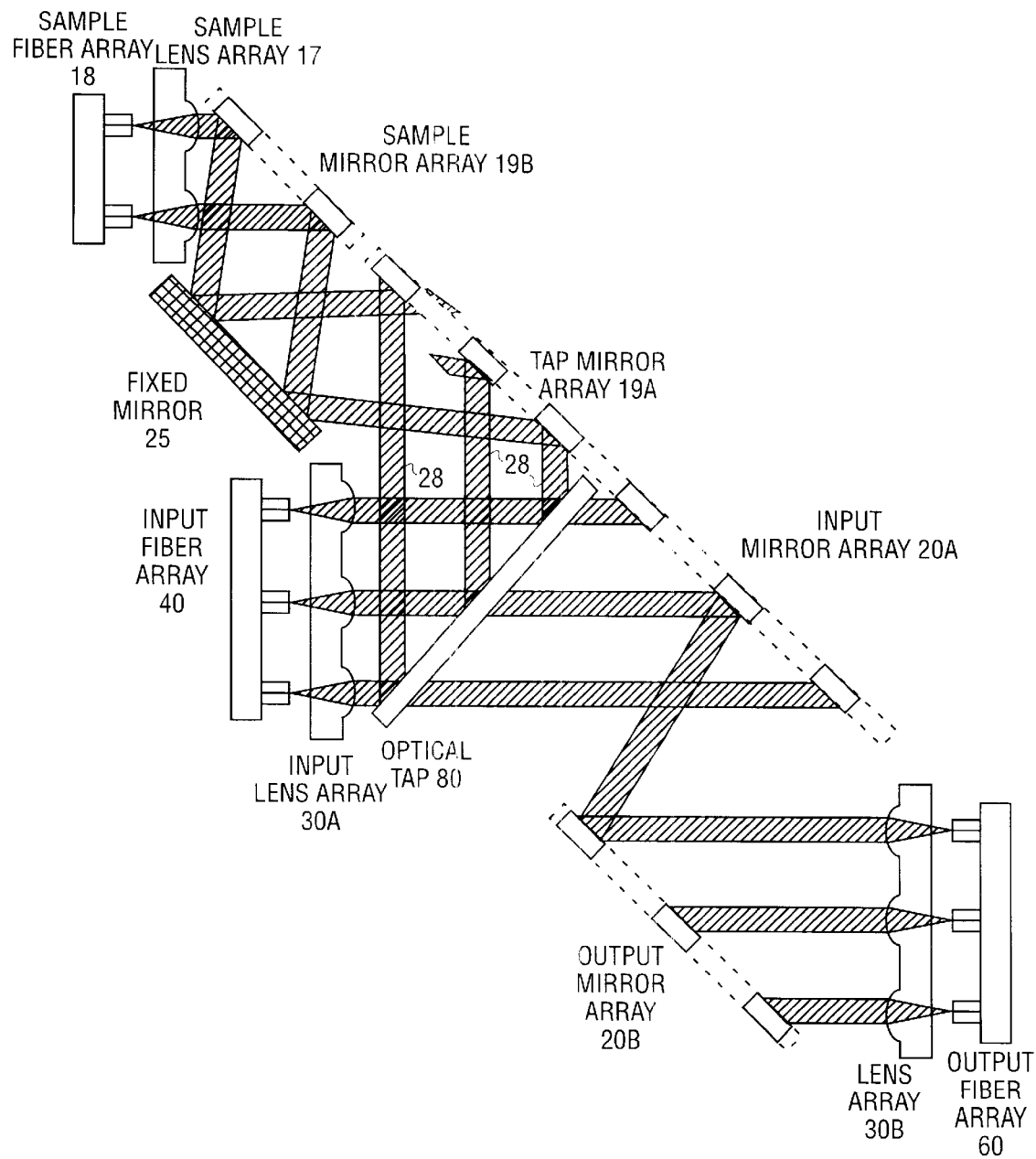
FIG. 10 shows another embodiment of an optical switch having a sampling device.

A simplification of the implementation of FIG. 9 is shown in FIG. 10. Tap mirror array 19A and sample mirror array 19B may be formed on the same substrate as input mirror array 20A. Sample beams 28 are reflected by tap 80 to tap mirrors in array 19A. The beams 28 then are reflected to fixed mirror 25, which reflects the beams to sample mirror array 19B. The beams 28 are then focused by sample lens array 17 and are received by sample fiber array 18.

Figure 11:
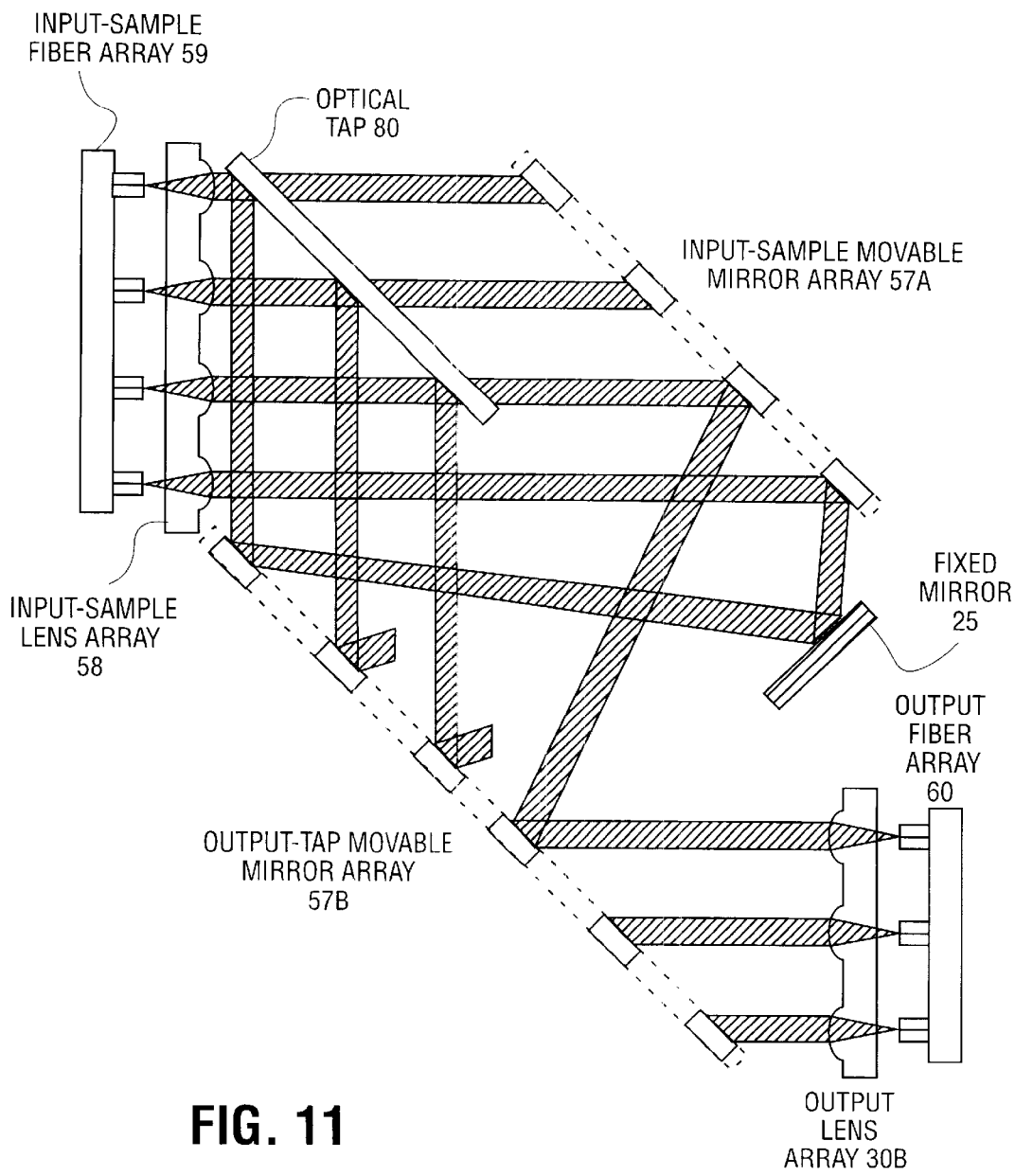
FIG. 11 is an embodiment of an optical switch and sampling device having sampled mirrors on the same substrate as the input and output mirror arrays.

A further simplification of the hardware results when the existing lens arrays and fiber blocks are used for the sampled ports as shown in FIG. 11. In this embodiment, the tap movable mirror array is integrated with the output movable mirror array to create a single combined tap and output movable mirror array 57B. The sample movable mirror array is integrated on the same substrate as the input movable mirror array, to provide a single combined sample and input movable mirror array 57A. The sample lens array is integrated with the input lens array, to provide a single combined sample and input lens array 58. The sample fiber array is integrated with the input fiber array to provide a single combined sample and input fiber array 59.

The optical tap 80 separates the input light beams from input fiber array of combined array 59 into a majority portion and a sample portion. The majority light beams pass through optical tap 80 to the input mirrors of combined sample and input movable mirror array 57A, and are reflected to the output mirrors of combined tap and output mirror array 57B. Then, the majority portion light beams are directed to output fiber array 60.

The sample portion light beams are reflected from optical tap 80 to the tap mirror portion of combined tap and output mirror array 57B. Then, the sample light beams strike fixed mirror 25, and are reflected to the sample mirrors on combined sample and input mirror array 57A. Each sample light beam is then reflected from array 57A through a sample lens in combined sample and input lens array 58 to a sample optical fiber in combined sample and input fiber array 59.

Figure 12:
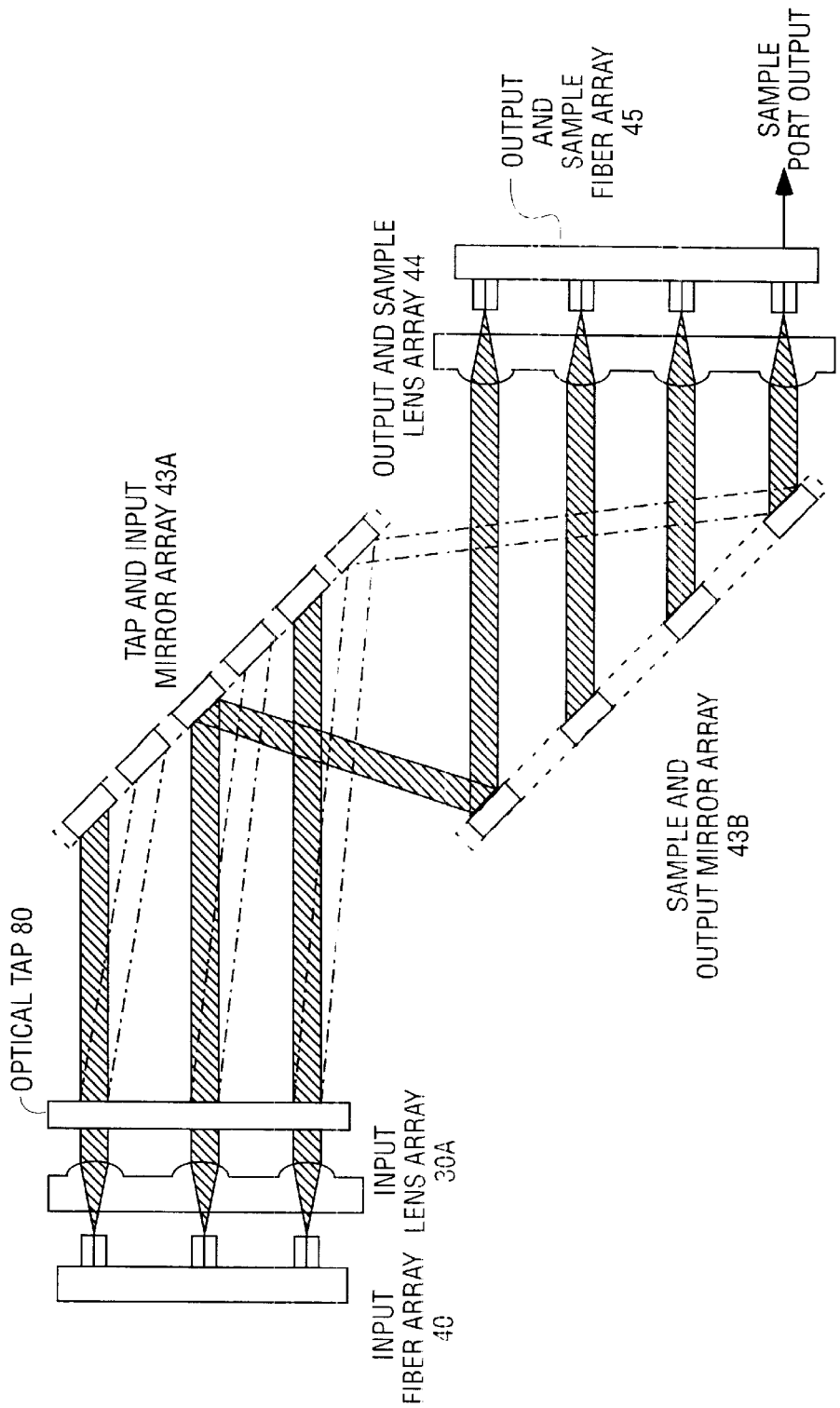
FIG. 12 is an embodiment of an optical switch and sampling device having a holographic beam splitter to steer the sample beams to mirrors interleaved within the input movable mirror array.

Another embodiment that also combines the mirror and lens arrays is shown in FIG. 12. In this embodiment, optical tap 80 is a holographic beam splitter that separates the input light beams into sample light beams and majority light beams. When the input beams pass through optical tap 80, the sample beams are directed at a small angle with respect to the majority beams.

The optical tap mirrors used to direct the sample beams are interleaved on the same substrate with the input mirrors, to provide a combined tap and input mirror array 43A. The number of tap mirrors in array 43A may be equal to the number of input mirrors in combined mirror array 43A.

The sample mirrors are on the same substrate as the output mirrors to provide a combined sample and output mirror array 43B. The number of sample mirrors in array 43B may be equal to the number of sample optical fibers. The output lens array and the sample lens array are combined to provide a single combined sample and output lens array 44. The output fiber array and the sample fiber array are combined to provide a single combined sample and output fiber array 45.

After the input beams pass through optical tap 80, the sample beams and the majority beams are reflected from combined tap and input mirror array 43A to combined sample and output mirror array 43B. The sample beams and the majority beams pass through combined lens array 44 to combined sample and output fiber array 45. The majority light beams enter output optical fibers in combined fiber array 45. At least one sample light beam enters a sample optical fiber in combined array 45. The number of sample light beams that enter array 45 may be equal to or less than the number of sample optical fibers in combined array 45.

Figure 13:
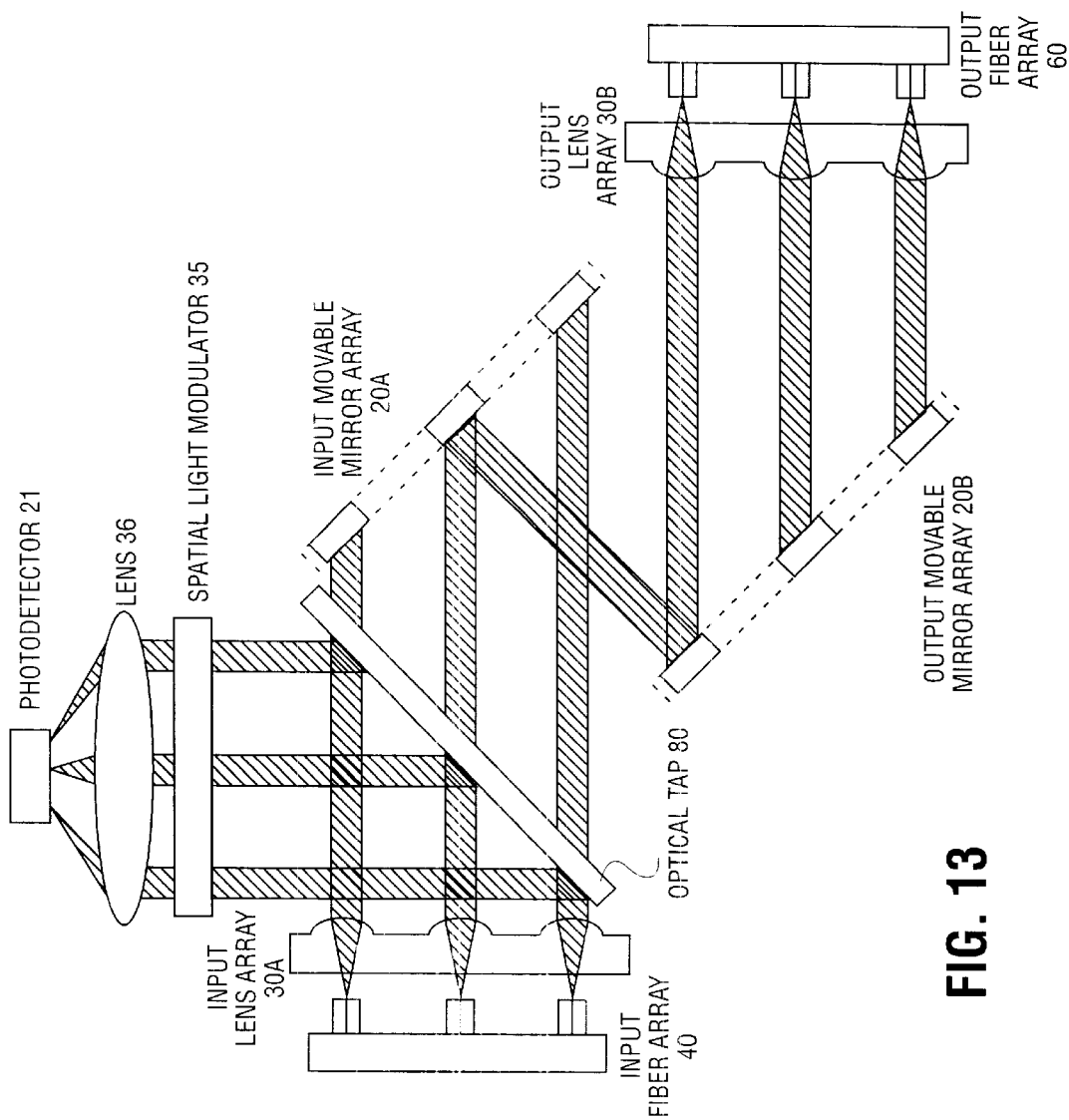
FIG. 13 is a cross-section an embodiment of an optical switch and sampling device, where sampled optical signals are directed to one or more photodetectors using a spatial light modulator and a lens.

Another embodiment of an apparatus to sample the light beams is shown in FIG. 13. Optical tap 80 separates the light beams into sample light beams and majority light beams. The majority light beams are directed through the switch to output fiber array 60 as discussed above. Selected sample light beams pass through spatial light modulator 35 to lens 36, which directs the sample light beam signals onto a photodetector 21. A spatial light modulator 35 attenuates, or blocks, all of the sample light beams except for a desired sample signal, so that only the one desired sample signal strikes photodetector 21. In this embodiment, the sample light beams pass through the spatial light modulator before passing through the lens. However, other arrangements of modulator 35 and lens 36 can be used. For example, the light may pass through lens 36, then through modulator 35.

The embodiment shown in FIG. 13 uses one single photodetector to provide an output for the sample signal. In alternative embodiments, the sample light beams may be optically split, then directed to multiple photodetectors, for example by using multiple lenses. More complicated configurations using at least one free-space optical power splitter to allow a sampled optical signal to be directed to more than one photodetector may also be used.

Figure 14:
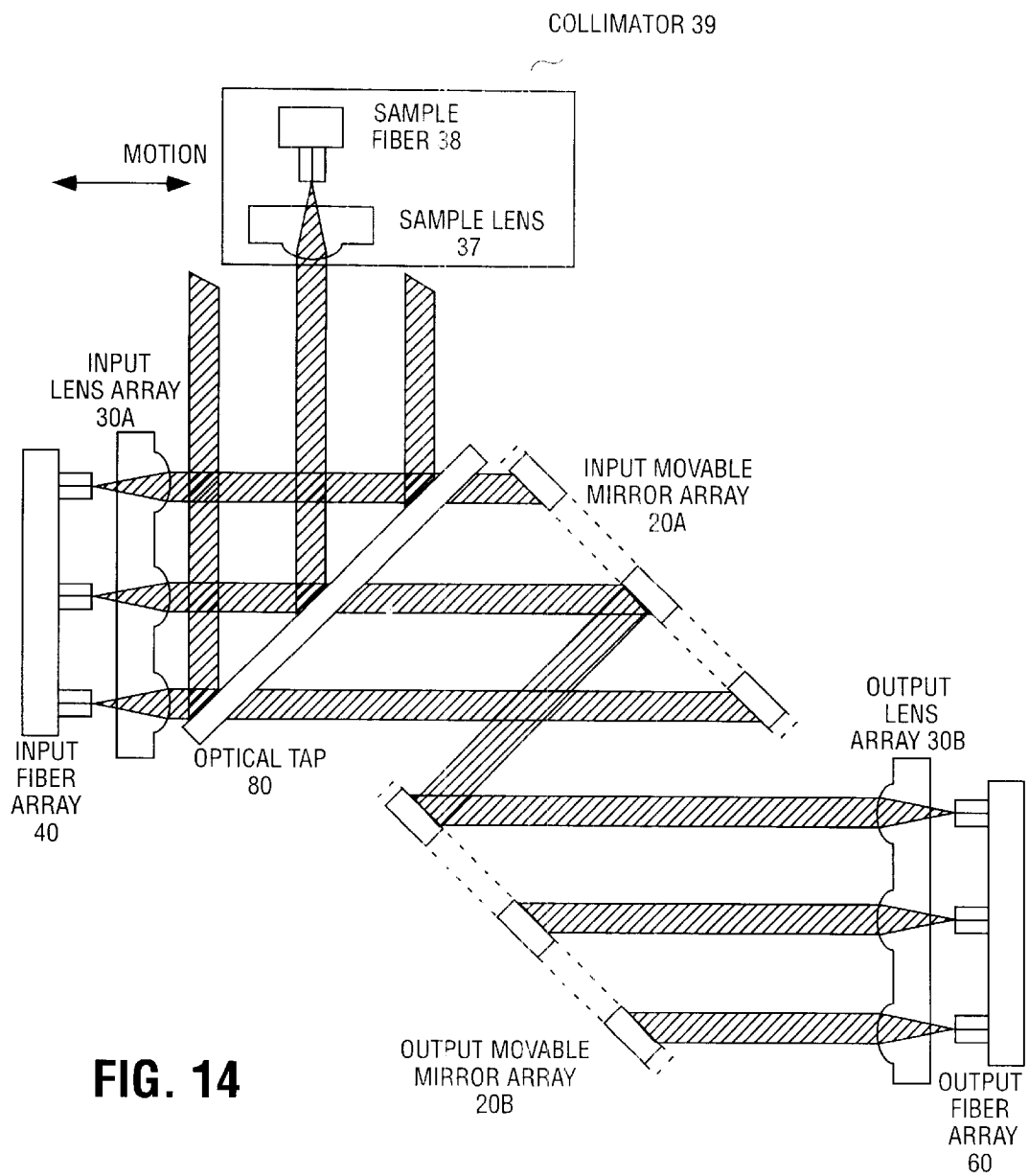
FIG. 14 is a cross-section an embodiment of an optical switch and sampling device, where a movable collimator is used to couple one of the sampled signals into an optical fiber.

Another embodiment of an apparatus to sample the light beams is shown in FIG. 14, with mechanical actuation of a movable fiber collimator 39, including sample lens 37 and sample fiber 38. Input light beams pass from input fiber array 40 through input lens array 30A to optical tap 80. The input beams are split into sample beams and majority beams by optical tap 80. The majority beams pass through the switch to output fiber array 60 as discussed above.

The sample light beams are directed to collimator 39. Collimator 39 can move along the one or two axes using mechanical actuation. Thus, the collimator 39 can move to the position of a desired sample light beam. The desired sample light beam then enters the collimator 39, where it passes through sample lens 37 into sample fiber 38.

In the foregoing specification, the invention has been described with reference to specific exemplary embodiments thereof. It will, however, be evident that various modifications and changes may be made thereto without departing from the broader spirit and scope of the invention as set for in the appended claims. The specification and drawings are, accordingly, to be regarded in an illustrative rather than a restrictive sense.

What is claimed is:

1. An optical switch, comprising:
   plurality of optical fiber input ports to input light beams into the switch;
   sample port;
   an optical tap to generate a sample portion of one of the light beams;
   movable sample mirrors to optically connect the optical tap to the sample port, wherein the optical tap, the sample mirrors, and the sample port comprise a single optical structure;
   movable switch mirrors to optically connect one of the input ports with one of the output ports; and
   plurality of optical fiber output ports to output the light beams from the switch.

2. The switch of claim 1 wherein the number of sample ports is less than the number of input ports.

3. The switch of claim 1 wherein said sample port directs sample portion of the optical power to a camera.

4. The switch of claim 1 further comprising a lens array, said lens array including lenses to collimate the light beams from the input port and a sample lens to collimate the sample portion into the sample port.

5. The switch of claim 1 wherein said plurality of optical fiber input ports and said sample port is located in a single input and sample fiber array block.

6. The switch of claim 1 wherein optical tap directs the sample portion to a movable array of sample mirrors, said sample mirrors direct the sample portion to one or more photodetectors.

7. An optical switch, comprising:
   plurality of optical fiber input ports to input light beams into the switch;
   at least one sample port;
   an optical tap to generate a sample portion of one of the light beams;
   movable sample mirrors to optically connect the optical tap to the at least one sample port;
   movable switch mirrors to optically connect one of the input ports with one of the output ports; and
   plurality of optical fiber output ports to output the light beams from the switch, wherein each input light beam has a corresponding optical sample port output.

8. The switch of claim 7 wherein the optical tap directs the sample portion to a movable array of sample mirrors, said sample mirrors direct the sample portion to optical fibers in said sample ports.

9. An optical switch, comprising:
   plurality of optical fiber input ports to input light beams into the switch;
   a sample port;
   an optical tap to generate a sample portion of one of the light beams;
   movable sample mirrors to optically connect the optical tap to the sample port;
   movable switch mirrors to optically connect one of the input ports with one of the output ports; and
   a plurality of optical fiber output ports to output the light beams from the switch, wherein the sample port comprises a spatial light modulator that selects a sample portion corresponding to a single light beam, and a fixed lens directs the selected sampled portion to a multimode fiber.

10. An optical switch, comprising:
    plurality of optical fiber input ports to input light beams into the switch;
    sample port;
    an optical tap to generate a sample portion of one of the light beams;
    movable sample mirrors to optically connect the optical tap to the sample port;
    movable switch mirrors to optically connect one of the input ports with one of the output ports; and
    a plurality of optical fiber output ports to output the light beams from the switch, wherein a single substrate contains the switch mirrors and the sample mirrors for the sample port.

11. An optical switch, comprising:
- plurality of optical fiber input ports to input light beams into the switch;
- sample port;
- an optical tap to generate a sample portion of one of the light beams;
- movable sample mirrors to optically connect the optical tap to the sample port;
- movable switch mirrors to optically connect one of the input ports with one of the output ports; and
- plurality of optical fiber output ports to output the light beams from the switch, wherein the sample port comprises a spatial light modulator that selects a sample portion corresponding to a single light beam, and a fixed lens directs the selected sample portion to a photodetector.

12. An optical switch comprising:
- light input means for inputting light beams into the switch;
- at least one sample port;
- optical tap means for generating a sample portion of the light beams;
- movable sample mirror means for optically connecting the tap to the sample ports;
- movable switch mirror means for optically connecting one of the input ports with one of the output ports; and
- light output means for outputting the light beams from the switch, wherein the optical tap means, the sample mirror means, and the sample port comprise a single optical structure.

13. The switch of claim 12 further comprising a lens array, said lens array including lenses to collimate the light beams from the input means and sample lenses to collimate the sample portion into the sample ports.

14. A method comprising:
- inputting a plurality of light beams into an optical switch;
- generating a sample portion of each of the plurality of light beams and an output portion of each of the plurality of light beams using an optical tap common to the plurality of light beams;
- optically directing the sample portion to a sample port; and
- optically switching the output portion to an output port.

15. The method of claim 14, wherein generating further comprises generating the sample portion of a respective light beam based on a percentage of power of the respective light beam.

16. An optical switch, comprising:
- a plurality of optical fiber input ports to receive a respective plurality of light beams into the optical switch;
- at least one sample port;
- a single optical tap to receive the plurality of light beams and generate a sample portion of each of the plurality of light beams;
- a plurality of sample lenses to optically couple the single optical tap to the plurality of sample ports;
- a plurality of optical fiber output ports to output the light beams from the optical switch; and
- a first plurality of movable mirrors to optically connect one of the input ports with one of the output ports.

17. The optical switch of claim 16, further comprising an array of movable tap mirrors, wherein the array of movable tap mirrors is integrated on a same substrate as the plurality of movable mirrors.

18. The optical switch of claim 16, further comprising:
- a spatial light modulator coupled to receive the sample portions from the optical tap and attenuate the sample portions except for a desired sample portion;
- a photodetector; and
- a fixed lens to receive the desired sample portion and focus the desired sample portion to the photodetector.

19. The optical switch of claim 16, wherein the sample output port comprises:
- a spatial light modulator configured to select a sample portion corresponding to a desired light beam; and
- a fixed lens optically coupled to the spatial light modulator to receive the selected sample portion and direct the selected sampled portion to a fiber.

20. The optical switch of claim 16, wherein the sample port comprises a movable fiber collimator to couple the sample portion to an optical fiber.

21. The optical switch of claim 16, wherein the sample portion of each of the plurality of light beams is based on a percentage of power of a respective light beam.

22. The optical switch of claim 16, wherein the optical tap, the plurality of sample lenses, and the sample port comprise a single optical structure.

23. The optical switch of claim 16, further comprising a camera, wherein each of the plurality of sample ports is configured to direct a respective sample portion of the light beams to the camera.

24. The optical switch of claim 16, further comprising:
- an input lens array to collimate the plurality of light beams from the input ports;
- an output lens array to focus the plurality of light beams to the output ports; and
- a second plurality of movable mirrors disposed between the input lens array and the output lens array, and wherein the first plurality of movable mirrors is disposed between the input lens array and the output lens array.

25. The optical switch of claim 24, wherein the optical tap is disposed between the input lens array and the first and second plurality of movable mirrors.

26. The optical switch of claim 24, wherein the optical tap is disposed between the output lens array and the first and second plurality of movable mirrors.

27. The optical switch of claim 16, wherein the plurality of input ports and the at least one sample ports are located in single array block.

28. The optical switch of claim 16, wherein each input light beam has a corresponding sample port.

29. The optical switch of claim 16, wherein the number of sample ports is less than the number of input ports.

30. The optical switch of claim 16, further comprising an array of movable tap mirrors, wherein the optical tap directs the sample portions to the array of movable tap mirrors.

31. The optical switch of claim 30, further comprising an array of movable sample mirrors, wherein the array of movable sample mirrors directs the light beams received from the array of movable tap mirrors to the at least one sample port.

32. The optical switch of claim 30, wherein the array of movable tap mirrors direct the sample portions to one or more photodetectors.

33. The optical switch of claim 16, further comprising a single movable tap mirror, wherein the optical tap directs the sample portions to the single movable tap mirror.

* * * * *